United States Patent [19]
Kulp et al.

[11] Patent Number: 5,961,939
[45] Date of Patent: Oct. 5, 1999

[54] PROCESS FOR RECOVERY OF SILVER FROM HARDENING PHOTOPROCESSING SOLUTIONS

[75] Inventors: James R. Kulp, Brockport; Charles S. Christ, Jr., Fairport; Jay E. Mathewson, Rochester, all of N.Y.

[73] Assignee: Eastman Kodak Company, Rochester, N.Y.

[21] Appl. No.: 09/054,121

[22] Filed: Apr. 2, 1998

Related U.S. Application Data

[63] Continuation-in-part of application No. 08/812,367, Mar. 5, 1997, abandoned.

[51] Int. Cl.⁶ .............................. C01G 5/00; C22B 11/00; G03C 5/00
[52] U.S. Cl. ................................ 423/43; 75/713; 430/398; 430/400
[58] Field of Search .................... 423/43; 75/713; 430/400, 398, 393

[56] References Cited

U.S. PATENT DOCUMENTS

| | | | |
|---|---|---|---|
| 4,963,474 | 10/1990 | Fujita et al. | 430/393 |
| 5,288,728 | 2/1994 | Spears et al. | 210/729 |
| 5,437,792 | 8/1995 | Szembrot et al. | 210/727 |
| 5,496,474 | 3/1996 | Christ, Jr. | 210/725 |

*Primary Examiner*—Steven Bos
*Attorney, Agent, or Firm*—John R. Everett

[57] ABSTRACT

There is provided a method for removing silver from photoprocessing solutions containing hardening agents which comprises:

a) adding a chelating agent to the photoprocessing solution in an amount sufficient to inhibit the precipitation of the high valent cations of the hardening agents;

b) adding a base to adjust the pH of the photoprocessing solution to a value above 5.5; and c) adding a chemical precipitant for the silver contained in the photoprocessing solution;

and optionally adding as a final component a flocculating agent which causes the precipitate to grow in size.

14 Claims, 3 Drawing Sheets

PROCESS FOR RECOVERY OF SILVER FROM HARDENING PHOTOPROCESSING SOLUTIONS

CROSS REFERENCE TO RELATED APPLICATION

This is a Continuation-In-Part of application Ser. No. 08/812,367, filed Mar. 5, 1997, now abandoned, entitled "Process For The Recovery Of Silver From Hardening Photoprocessing Solutions" by James Kulp, Charles Christ, Jr. and Jay Mathewson.

FIELD OF THE INVENTION

This invention relates to the field of silver recovery and involves a method for the removal of silver by precipitation from photoprocessing solutions containing hardening agents, which contain high valent cations in concentrations large enough to interfere with phase separation, i.e., filtration of the precipitated silver from the remaining photoprocessing solution. These methods include the use of trisodium-trimercapto-s-triazine to precipitate silver in the presence of hardening agents.

BACKGROUND OF THE INVENTION

During the processing of silver halide photographic products, silver is removed from the photographic film by contact with a fixing solution. The silver is generally solubilized by reaction with thiosulfate ion. Such a process results in a solution rich in soluble silver.

Two main reasons exist for the recovery of silver in fixing and bleach fixing solutions. First, there exists a regulatory compliance issue. Second, the silver in the solution has monetary value. Another reason for recovering silver, is to reuse a limited resource. In many cases the recovered silver is used again in manufacturing photographic products. Thus, silver recovery is one step in a recycling process.

There are many techniques for recovering silver from photographic solutions: electrolytic silver recovery, metal replacement, ion exchange, chemical reduction, and precipitation methods. Electrolytic silver recovery is one of the most popular methods for the recovery of silver, but is not generally sufficient for those photoprocessors operating in the regulatory compliance mode. Electrolytic techniques do not usually remove silver from photographic solutions to concentrations lower than about 100 ppm. Often a tailing or secondary silver recovery method is also necessary. Ion exchange methods are more suited to secondary silver recovery as are metal replacement cartridges.

Recently, several methods for silver recovery have been disclosed which comprise a precipitation process using a chemical precipitant known as TMT or trimercapto-s-triazine (U.S. Pat. No. 5,288,728, U.S. Pat. No. 5,437,792, U.S. Pat. No. 5,476,593, U.S. Pat. No. 5,496,474.) The precipitation method is a continuous process that replaces a two step silver recovery with a single silver precipitation, flocculation and filtration. The process is simple to use, neat, and consistently allows the photoprocessor to remain in regulatory compliance with respect to silver levels in the photographic effluent. The silver TMT precipitate is easily refined and considered to be a good feed for certain refining operations.

Certain photographic products (mostly films and a few B&W papers) have features that are determined in part by gel hardening that occurs as a result of additives (hardening agents) contained in the fixer solution. The additives are generally high valent cations such as $Al^{3+}$ or $Zr^{4+}$ that are contained in a low pH fixer solution. Such solutions are sometimes referred to as "hardening fixers." While said additives have a profoundly positive effect for the photographic product, a corresponding difficulty arises for the treatment of the "hardening fixers" during silver recovery using the TMT precipitation process. Since the pH of hardening fixer is usually below 5, the TMT precipitation process is hampered. TMT is a trithiolate compound which undergoes changes via protonation at various pH's and is expected to function most efficiently at pH's above 7 or 8.

A secondary consideration in TMT precipitation is that typical photographic solutions treated by the TMT process contain ammonium ion. The pH of said solutions cannot reasonably be raised above about 8.5 without appreciable production of ammonia gas. Therefore the solutions are generally treated in a range at or below a pH of about 8 to 8.5. If the pH of the solution is below 5, the efficiency of the precipitation of silver by TMT is significantly reduced because at least two of the three active thiolate sites on the molecule are protonated resulting in high levels of silver in the final treated effluent. The decrease in precipitation efficiency at low pH necessitates that a base be added to the silver bearing fixer to raise the pH into a range in which the TMT precipitant functions more effectively.

However, for hardening fixers, a fundamental difficulty arises in any process involving an increase in the pH of the fixer above about 5.5. At such pH's the hardening agent is observed to precipitate. Precipitates of typical hardening agents are exceedingly hydrous and "gel-like." As a result such precipitates are extremely difficult or nearly impossible to filter. Since the TMT precipitation process relies strongly on the facile separation of the silver containing solid from the treated solution, the formation of the a "gel-like" precipitate adversely effects the performance of the process.

The problem is summarized as follows: TMT precipitation is an excellent process for the removal of silver from photoprocessing solutions. However, the pH of hardening fixers must be elevated substantially above 5.5, in order for the TMT to precipitate silver effectively. If the pH of the hardening fixer is raised above 5.5 precipitation of the hardening agent occurs and prevents the efficient operation of the process. The problem to be solved by the present invention is to provide a process for precipitating silver from hardening photoprocessing solutions, without concomitant or subsequent precipitation of the undesired hardening agent.

SUMMARY OF THE INVENTION

It is an object of the present invention to remove soluble silver from solutions containing high valent cations.

It is another object of the present invention to remove silver from photoprocessing solutions containing hardening agents with high valent cations by a precipitation process.

It is yet another object of the present invention to remove silver from photoprocessing solutions containing hardening agents with high valent cations by precipitating the silver without precipitating the high valent cations of the hardening agents.

These and other objects will become apparent from the detailed disclosure and claims which follow, together with the accompanying drawings.

The objects are achieved through the method of the present invention, wherein chelating agents are added to a solution containing soluble silver, such as photoprocessing solutions, to prevent precipitation of high valent cations such as those from hardening agents, as the pH of the solution is elevated for treatment with chemical precipitants such as trisodium-trimercapto-s-triazine (TMT).

There is provided by this invention a process for precipitating soluble silver from solutions containing high valent cations which comprises adding a chelating agent to a solution containing silver and high valent cations to complex the high valent cations, adjusting the pH of the solution to a value above 5.5 and precipitating silver by the addition of a chemical precipitant.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION OF THE INVENTION

Figure 1:
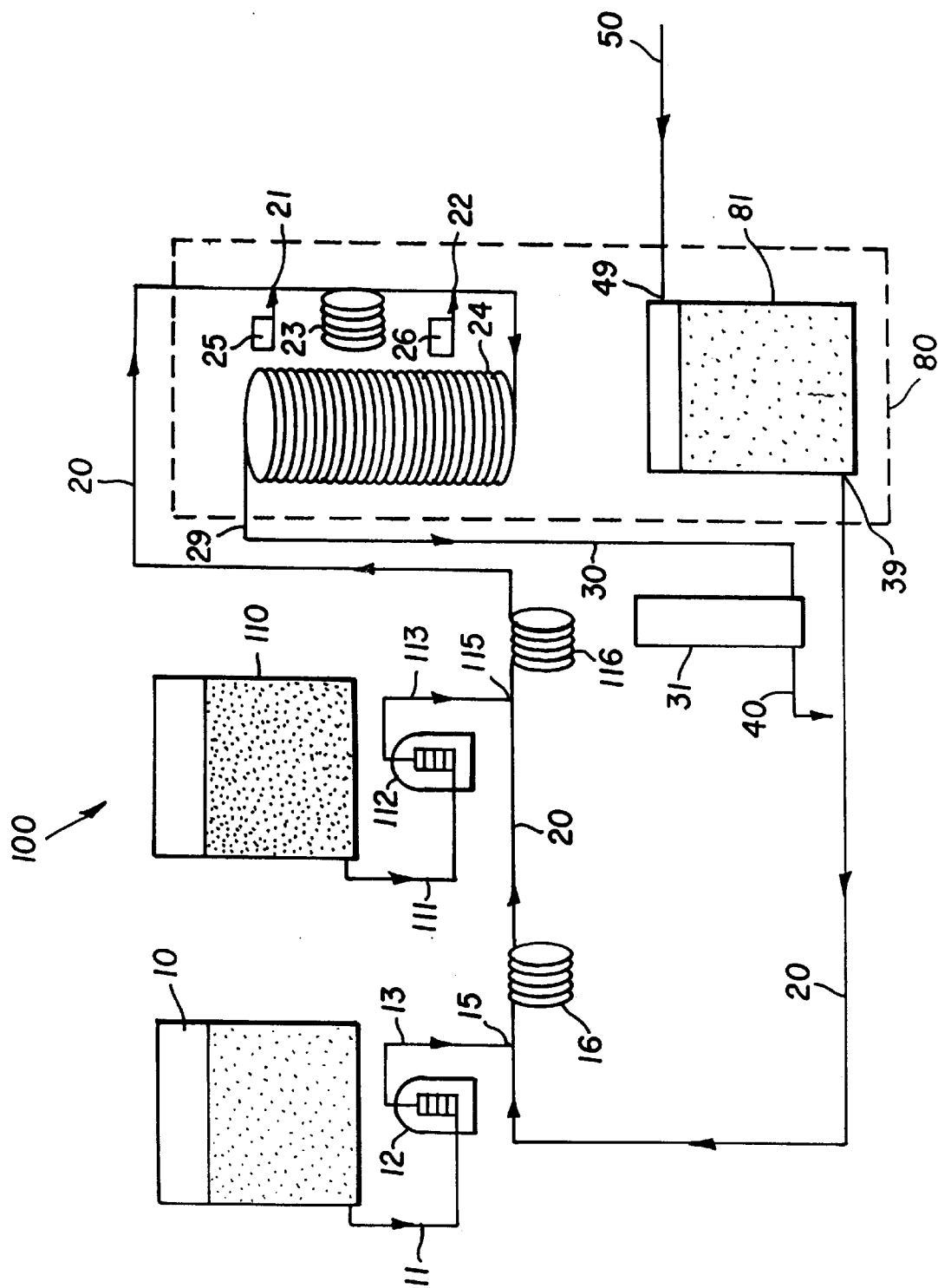
FIG. 1 is a schematic representation of an apparatus in which silver recovery is carried out.

In the silver recovery process of the present invention, chelating agents are added to solutions of silver to complex the high valent cations, such as those of hardening agents, and prevent their precipitation as the pH of the silver solution is elevated. Aluminum and Zirconium are the high valent cations of highest concern in hardening fixer solutions. At any pH substantially above 5.5, precipitation of Al and Zr begins to occur. However, it is necessary to raise the pH of the solution of soluble silver above 5.5 to effectively precipitate silver with conventional chemical precipitants. With the addition of the chelating agents to the solutions of the silver, such as hardening fixer solutions, the precipitation of the high valent cations of the hardening agent is avoided and conventional procedures for precipitation of silver as described in U.S. Pat. No. 5,288,728, U.S. Pat. No. 5,437,792, U.S. Pat. No. 5,476,593, and U.S. Pat. No. 5,496,474 can be effectively practiced.

The chelate employed is dependent on the high valent cations within the solution of silver. For a particular high valent cation, suitable chelates can be determined from:

IUPAC Chemical Society Series, "Stability Constants of Metal-Ion

Complexes: Part B", *Organic Ligands,* 2nd Ed., Pergamon Press 1979;

Ringbom, *Complexation in Analytical Chemistry,* Interscience

Publishers 1963;

Bjerrum et al., *Stability Constants of Metal-Ion Complexes, with*

*Solubility Products of Inorganic Substances, Part I: Organic*

*Ligands,* Special Publication No. 6, London: The Chemical Society,

Burlington House, W.1 1957; and

Bjerrum et al., *Stability Constants of Metal-Ion Complexes, with*

*Solubility Products of Inorganic Substances, Part II: Inorganic*

*Ligands,* Special Publication No. 7, London: The Chemical Society,

Burlington House, W.1 1958.

Suitable chelates typically fall within the group of carboxylic chelates, amine carboxylate chelates, polycarboxylate chelates and polymeric chelates. Preferred chelates for $Al^{+3}$ include sodium citrate dihydrate and EDTA dihydrate.

The invention encompasses the use of any amount of chelate; however, preferred amounts of chelate are dependent to some extent on the amount of hardening agent in solution. Although some high valent cations form very insoluble complexes under the conditions found necessary to effectively precipitate silver, it has been discovered that a stoichiometric amount of chelate is not necessary to prevent precipitation of the high valent cations of hardening agents. For example, at a pH above 6.0, the $K_{sp}$ of $Al(OH)_3$ is on the order of $10^{-33}$ and an X-ray fixer may contain about 0.75 g/l of Al from hardening agents. The stoichiometric value for complexation of all the Al in the fixer is 0.027 M chelate, assuming a 1:1 complex is formed in the chelation reaction with Al. However, this fixer solution can be stabilized toward precipitation of $Al(OH)_3$ even at pH 7, by the addition of far less chelate. An amount of only 0.0067 M sodium citrate is suitable, which is a concentration 4 times less than the stoichiometric amount.

The use of small amounts of chelate is desirable to minimize costs. By using only a fraction of the stoichiometric amount of chelate for effective prevention of precipitation of hardening agents, the process is very efficient. The ability to use small amounts of chelate also provides advantage where the chelate is to be added with the chemical precipitant for silver. Solubility of the complexing agent is less of a concern. For example, if a stoichiometric amount of chelate were necessary to treat the effluent stream of the X-ray fixer discussed above flowing at 200 ml/min and the chemical precipitant, TMT, were in a 15% solution added at a rate of 5 mil/min, the TMT solution would require between 300 g/l and 400 g/l of chelate. Such high concentrations are not readily achievable. However, since a stoichiometric amount of chelate is not necessary to achieve the desired effect (only 70 g/l of the chelate sodium citrate need be dissolved in the TMT 15% solution to be effective), simultaneous addition of effective amounts of chelate and chemical precipitant is possible.

In general, we have found 0.15 to 1.5 moles of chelating compound per mole of hardening agent to be useful. Within this general range 0.17 to 1.0 moles/liter and especially 0.2 to 0.5 moles/liter have been found useful.

The chelate can be added to the silver solution alone or in combination with a base or in combination with a base and chemical precipitant such as TMT. A flocculant is preferably added after these three (chelate, base, chemical precipitant) have been added to the solution of soluble silver. Where the chelate is added alone, the base and chemical precipitant can be added alone, with base preferably being introduced first, or in combination. More detailed procedures are outlined below.

Protocol 1

In a preferred embodiment, the chelate is added to the photoprocessing solution containing silver and hardening agents before the addition of base and TMT chemical precipitant to give a final molar concentration of chelate at or about ¼ the molar concentration of hardener cations, assuming a 1:1 ratio of chelate:hardener cation complex is formed. Sufficient base is added to maintain the pH of the treated solution in the range of 6.0 and 9.0. The chemical precipitant TMT is then added to form a precipitate and preferably, the subsequent chemical step in the process is the addition of flocculant.

Protocol 2

In another embodiment, the chelate is added with the base in an equal volume with the photoprocessing solution containing silver and hardening agent to give a final molar concentration of chelate at or about ¼ the molar concentration of hardener cations, assuming a 1:1 ratio of chelate::hardener cation complex is formed. The TMT chemical precipitant is added in the second step and preferably, the addition of flocculant follows.

Protocol 3

In another embodiment, the chelate is added to the photoprocessing solution containing silver and hardening agents first to give a molar concentration of chelate at about ⅕ the molar concentration of hardener, assuming a 1:1 ratio of chelate: hardener cation complex is formed. The TMT chemical precipitant is added in the second step with sufficient base to achieve a final treated solution pH between 6.0 to 9.0. Preferably, the addition of flocculent follows.

Protocol 4

In a further embodiment, the chelate, the base and the TMT chemical precipitant are added together to the photoprocessing solution containing silver and hardening agent. Where the amount of the chelate, base and TMT is predetermined for specific photoprocessing solutions so that the pH is adjusted to the appropriate level (between 6.0 and 9.0), and the amount of TMT is sufficient to reduce silver to the desired level in the treated effluent, and the chelate is present in amount to give a treated solution a molar concentration of at least ¼ that of the molar concentration of hardener cations, assuming a 1:1 ratio of chelate:hardener cation complex is formed. The final addition step in the process is the addition of flocculant.

The process for precipitating silver of this invention is preferably a part of a silver recovery procedure, such as those described in U.S. Pat. Nos. 5,496,474, 5,476,593, 5,288,728 and 5,437,792. The process is particularly suited for treating spent photoprocessing solutions that contain hardening agents (hardening fixers) with a pH below 5.5. Examples include RP X-OMAT Fixer, EA-5 fixer and Kodak 885 fixer. These fixing solutions contain high valent cations which typically have a valence of +2 and above. The most common high valent cations within hardening fixer solutions are $Al^{+3}$ and $Zr^{+4}$.

The amount of chelating agent added is preferably less than ½ the stoichiometric amount needed to complex all of the high valent cations in solution. Amounts of less than ¼ the stoichiometric amount needed to complex all of the high valent cations in solution at a 1:1 ratio have utility and are preferred in some embodiments. Examples of preferred chelating agents include sodium citrate dihydrate and EDTA dihydrate.

For the precipitation of silver to be effective, the pH of the solution must be raised above 5.5, preferably within the range of 6.0–9.0. Any inorganic base is suitable with NaOH being preferred.

The chemical precipitant can be any conventional precipitant for silver including the mercapto-s-triazines described in U.S. Pat. No. 5,288,728 of the formula I.

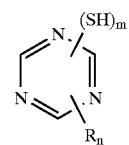

wherein: wherein:
R is H, $-NH_4$, $-OH$, $C_{1-8}$ alkyl, $C_{1-8}$ alkoxy, phenyl, cyclohexyl, oxazinyl, phenoxy, NR' or SR";
R' is H, $C_{1-8}$ alkyl, phenyl, cyclohexyl, naphthyl or benzyl;
R" is $C_{1-8}$ alkyl, phenyl, cyclohexyl, naphthyl or benzyl,
m=1–3 and
n=0–2.

The salt form of the mercapto-s-triazine compounds are preferred for the process of the invention for their increased solubility compared to their acid form. The mercapto-s-triazine compound can be provided in solid form or in the form of an aqueous solution for contacting the seasoned solutions. A preferred mercapto-s-triazine compound is the trisodium salt of mercapto-s-triazine, which is sold by Degussa under the product name "TMT-15".

The amount of mercapto-s-triazine used to contact the mixture of seasoned solutions can be determined based on the concentration of silver ion in the mixture. Generally, it is desirable to use an excess of the stoichiometric quantity of the compound to the silver concentration, as may be seen from the examples below. The concentration of silver in the mixture of seasoned solutions can first be determined by means of conventional analytical methods, for example, photometry, potentiometry, or atomic absorption spectroscopy. The operator can also make a best estimate based on the knowledge of the seasoned solutions and the proportions of each such solution present. For example, a bleach-fix solution that is removed from a minilab tank after the system has reached a substantially steady state condition can have a reasonably predictable silver concentration. The excess amount used is dependent on which compound of formula I is used, which can readily be determined by the operator based on preliminary tests with the specific compound to be used. Using the trisodium salt of trimercapto-s-triazine, a preferred amount is from about 1–3 moles per 3 moles of silver in the mixture of seasoned solutions undergoing treatment, and particularly preferred is from about 1.5–2.0 per 3 moles of silver. The ratio is provided per 3 moles of silver since each molecule of trimercapto-s-triazine is capable of complexing 3 silver ions.

As for the flocculant, any conventional flocculant for silver precipitants, such as those disclosed in U.S. Pat. No. 5,437,792, are suitable. Useful commercially available flocculants include materials from Calgon under the tradenames POL-E-Z-2406; E-2280; E-2272; and E-2267.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by weight.

The entire disclosures of all applications, patents and publications, cited above and below, are hereby incorporated by reference.

Control Example pH at or below 6.0, No Chelate

Four-500 ml samples of RP X-OMAT Fixer (1.25 g/l Ag, pH 4.5) were added to square 1 liter mixing jars and placed in a "gang" paddle mixer. Various amounts of 15% TMT containing 140 g/l potassium carbonate were added to the fixer sample. After the treatment of each sample, the pH was measured, and a sample was taken to determine the concentration of silver in the treated effluent. About 5 ml of the TMT solution was added to the first sample, and the pH of the treated fixer was 4.8 with a final silver concentration of 420 ppm. No precipitation of $Al(OH)_3$ was observed after treatment in the first sample. About 10 ml of the TMT solution was added to the second fixer sample, and the pH of the treated fixer was 5.2 with a final silver concentration of 20 ppm. No $Al(OH)_3$ precipitate was observed after treatment in the second sample. About 15 ml of the TMT solution was added to the third sample, and the pH of the treated fixer was 5.5 with a final silver concentration of 9.5 ppm. No $Al(OH)_3$ precipitate was observed after treatment in the third sample. About 20 ml of the TMT solution was added to the fourth sample, and the pH of the treated fixer was 6.0 with a final silver concentration of 5 ppm. However in the fourth sample $Al(OH)_3$ precipitate was observed after the treatment.

This example shows that the efficiency of TMT precipitation of silver is low even at pH's as high as 6.0 and even with tremendous excesses of precipitating agent added. A normal dosage of TMT for a solution containing 1.25 g/l silver is approximately 9 ml/l. In the present example only 500 ml of a 1.25 g/l solution is treated with up to 500% excess of the precipitating agent and the process still does not remove the silver from the solution to below 5 ppm.

Example 1

Sodium Citrate Dihydrate

Four-500 ml samples of RP X-OMAT Fixer (1.25 g/l Ag, pH 4.5) were added to square 1 liter mixing jars and placed in a "gang" paddle mixer. The control sample had no sodium citrate dihydrate added. The three other samples had 1, 2, and 3 g/l sodium citrate dihydrate. Aliquots of 50% NaOH were added to each of the samples and the samples were observed for the formation of $Al(OH)_3$ precipitate. After the addition of 4.0 ml of 50% NaOH to give a fixer pH of about 6.0, the precipitation of $Al(OH)_3$ was observed to occur in the control. In contrast, for the samples containing 1 g/L (0.10 moles/liter), 2 g/L (0.20 moles/liter), and 3 g/L (0.30 moles/liter) of sodium citrate dihydrate, no $Al(OH)_3$ was observed, even after the addition of 5.5 ml of 50% NaOH to give a pH of approximately 7.3. After approximately one hour, no $Al(OH)_3$ was observed to form in the samples.

As a second test, 5 ml of 15% TMT containing 140 g/l $K_2CO_3$ was added to the three test samples containing sodium citrate. The sample containing only 1 g/l sodium citrate dihydrate showed the formation of $Al(OH)_3$ as a white haze in the solution. However, in the solutions containing 2 or 3 g/l sodium citrate dihydrate, no $Al(OH)_3$ precipitate was observed with the pH reaching a value of 7.9. A sample was taken from the solution containing 1 g/l sodium citrate dihydrate and ICP-AES was used to determine a silver concentration of 2 ppm.

This example shows that the addition of sodium citrate dihydrate in molar concentrations approximately 4 times lower than the molar concentration of the Al hardening agent is effective in preventing the precipitation of $Al(OH)_3$, even at pH's well above 7.0.

The formation of $Al(OH)_3$ precipitate is observed only in the extreme case of one hour incubation time and an excessive pH increase to above pH 7.9. This clearly shows that the addition of only a small amount of chelate has a profound effect on the kinetics of $Al(OH)_3$ formation. More judicious control of pH will easily permit the reduction of added chelate to levels of about 0.15 moles of chelate per mole of hardening agent.

Example 2

Sodium Citrate Dihydrate and Flocculant

Three - 500 ml samples of RP X-OMAT Fixer (1.25 g/l Ag, pH 4.5) were added to square 1 liter mixing jars and placed in a "gang" paddle mixer. Sodium citrate dihydrate was added to the 3 jars to give concentrations of 1, 2, and 3 g/l. To each of the three jars, 3 ml of 50% NaOH was added to increase the pH to a level more suitable for the precipitation of silver with TMT. The pH of the fixer was 5.8 after addition of the NaOH solution. About 10 ml of TMT 15% containing 140 g/l potassium carbonate was added to the fixer solutions in each of the three jars. A yellow precipitate was observed to form immediately in all three jars. The pH of the treated solutions was 6.5. Flocculant was added (5 ml) to agglomerate the precipitate. A white haze, indicative of the formation of $Al(OH)_3$ was observed in the fixer containing 1 g/l sodium citrate dihydrate. No $Al(OH)_3$ precipitate was observed in the fixer solutions containing either 2 or 3 g/l sodium citrate dihydrate. Samples of the solutions were passed through 0.45 micron filters and analyzed for silver content by ICP-AES. The results of the silver analysis showed that all three samples contained silver at concentrations less than 5 ppm. For the 1, 2, 3 g/l sodium citrate dihydrate solutions, the silver concentrations were 3.5, 1.9, 4.0 ppm respectively. The solutions were monitored for changes in pH and for precipitate formation. Over a period of more than 1 month, no precipitation of $Al(OH)_3$ was observed in the solutions containing 2 or 3 g/l sodium citrate dihydrate, and the pH was measured at approximately 7.

This example shows that the addition of sodium citrate dihydrate in molar concentrations of about 4 times lower than the molar concentration of the Al hardening agent is effective in preventing the precipitation of $Al(OH)_3$ as the pH of the fixer solution is elevated to increase the efficiency of the silver precipitation by TMT.

Example 3

Disodium EDTA Dihydrate

In a series of five 250 ml beakers using magnetic stir bars for mixing, 100 ml samples of seasoned EA-5 fixer with a pH of about 4.1, were mixed with a solution of 50 mls of the following concentrations of disodium EDTA dihydrate (10 g/l, 20 g/l, 30 g/l, 40 g/l, and 50 g/l). A sodium carbonate solution (50 mls) was then added to each beaker to elevate the pH to around 7.5, yielding solutions containing 2.5 g/l, 5 g/l, 7.5 g/l, 10 g/l and 12.5 g/l of disodium EDTA dihydrate. The samples were set aside for observation. After a period of two weeks, it was noted that the beakers containing a total of 7.5 g/l, 10 g/l, and 12.5 g/l of disodium EDTA dihydrate showed no precipitation of the hardening agent. The samples containing a total of 2.5 g/l and 5.0 g/l disodium EDTA dihydrate showed hardening agent precipitate.

Example 4

Disodium EDTA (30 g/l)

An EA-5 fixer solution is treated in the silver recovery unit 100, shown in FIG. 1, which incorporates silver precipitating unit 80, according to U.S. Pat. No. 5,437,492. Silver precipitating unit 80 comprises a vessel 81 which receives untreated EA-5 fixer via line 50 at inlet 49 and is drawn off via line 20 at outlet 39 to form a continuous stream flowing at a rate of 100 mls/minute. A solution of about 30 g/l disodium EDTA dihydrate in storage vessel 10 is drawn off via line 11 by pump 12 and fed to line 20 via line 13 and injection tee 15. The solution is injected at a rate of about 50 mils per minute into a seasoned EA-5 fixer solution with a pH of about 4.1 in line 20, flowing at a rate of 100 mls per minute. The resulting solution was then mixed within a tubular reactor 16. A solution of 90 g/l sodium carbonate in storage vessel 110 is drawn to pump 112 via line 111. The sodium carbonate is then fed to line 20 via line 113 and injected through an injection tee 115 at a rate of 50 mls per minute into the combined solution of seasoned EA-5 fixer and disodium EDTA dihydrate in line 20. The resulting solution is then mixed within a tubular reactor 116. The solution is then returned to silver precipitation unit 80 which employs TMT as a silver precipitating agent, and a flocculant to agglomerate the TMT-silver precipitate.

Within silver precipitating unit 80, TMT from source 25 is injected into the EA-5 fixer within line 20 at inlet 21. The solution is mixed within a tubular reactor 23 positioned downstream of inlet 21. Flocculant from source 26 is introduced to the EA-5 fixer within line 20 at inlet 22. The treated EA-5 fixer is then mixed in a large tubular reactor 24 positioned downstream of inlet 22.

The treated solution exits precipitation unit 80 through outlet 29 via line 30 to filter 31. From filter 31, the solution is discharged via line 40.

Over 5 gallons of seasoned EA-5 fixer with a silver level over 7.0 g/l was treated using this method. During the course of treatment, the effluent silver level from discharge 40 did not exceed 1.0 ppm, nor was there any precipitate formation noted in filter 31. It was concluded that pretreatment of seasoned EA-5 fixer with a total of about 7.5 g/l of disodium EDTA dihydrate followed by an addition of sodium carbonate solution prevented formation of the hardening agent precipitate and enabled successful TMT treatment of hardened seasoned EA-5 fixer to yield treated solutions with silver levels less than 1 ppm.

Example 5

Disodium EDTA (15 g/l)

Figure 2:
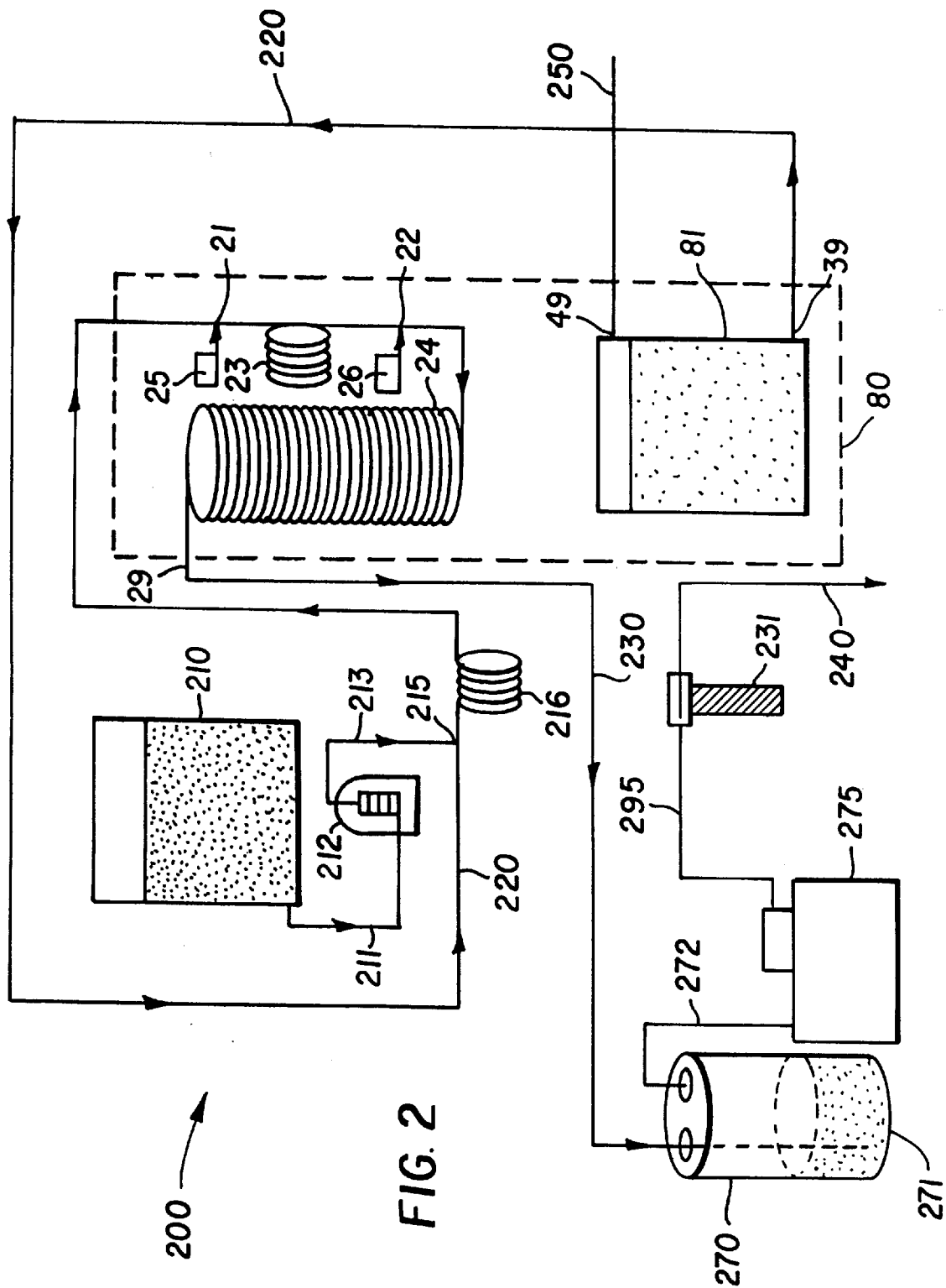
FIG. 2 is a schematic representation of another apparatus in which silver recovery is carried out.

An EA-5 fixer solution is treated in the silver recovery unit 200 shown in FIG. 2 which also incorporates a silver precipitating unit 80, according to U.S. Pat. No. 5,437,792 and described above. Silver precipitating unit 80 comprises a vessel 81 which receives untreated EA-5 fixer via line 250 at inlet 49 and is drawn via line 220 at outlet 39 to form a continuous stream of untreated EA-5 fixer flowing at a rate of 100 mls/minute. A solution of 15 g/l disodium EDTA dihydrate and 45 g/l sodium carbonate in storage vessel 210 is drawn off by line 211 by pump 212. The solution is then pumped to line 220 via line 213 and injected at a rate of 100 mls per minute through injection tee 215 into a seasoned and untreated EA-5 fixer solution with a pH of about 4.1, in line 220, flowing at a rate of 100 mls per minute. The resulting solution is then mixed within a tubular reactor 216. The solution is then returned to a silver precipitation unit 80 which employs TMT as a silver precipitating agent, and a flocculant to agglomerate the TMT-silver precipitate, as described above.

The treated solution exits precipitation unit 80 through outlet 29 via line 230 to settling drum 270. TMT sludge is allowed to settle to bottom 271 and the solution is skimmed and drawn off with line 272 to transfer sump 275, where further separation takes place before delivery to filter 231 via line 295 and discharge via line 240.

About 10 gallons per day of seasoned EA-5 fixer with a silver level over 7.0 g/l was treated using this method. During the course of treatment, the effluent silver level from discharge 240 averaged under 1.0 ppm, nor was there any precipitate formation noted in the filter 231 which followed a 15 gallon sludge settling tank 270. It was concluded that pretreatment of seasoned EA-5 fixer with a solution mixture of EDTA and sodium carbonate prevented formation of the hardening agent precipitate and enabled successful TMT treatment of hardened seasoned EA-5 fixer to give a treated solution with silver levels below about 1 ppm.

Example 6

Disodium EDTA (7.5 g/l)

Figure 3:
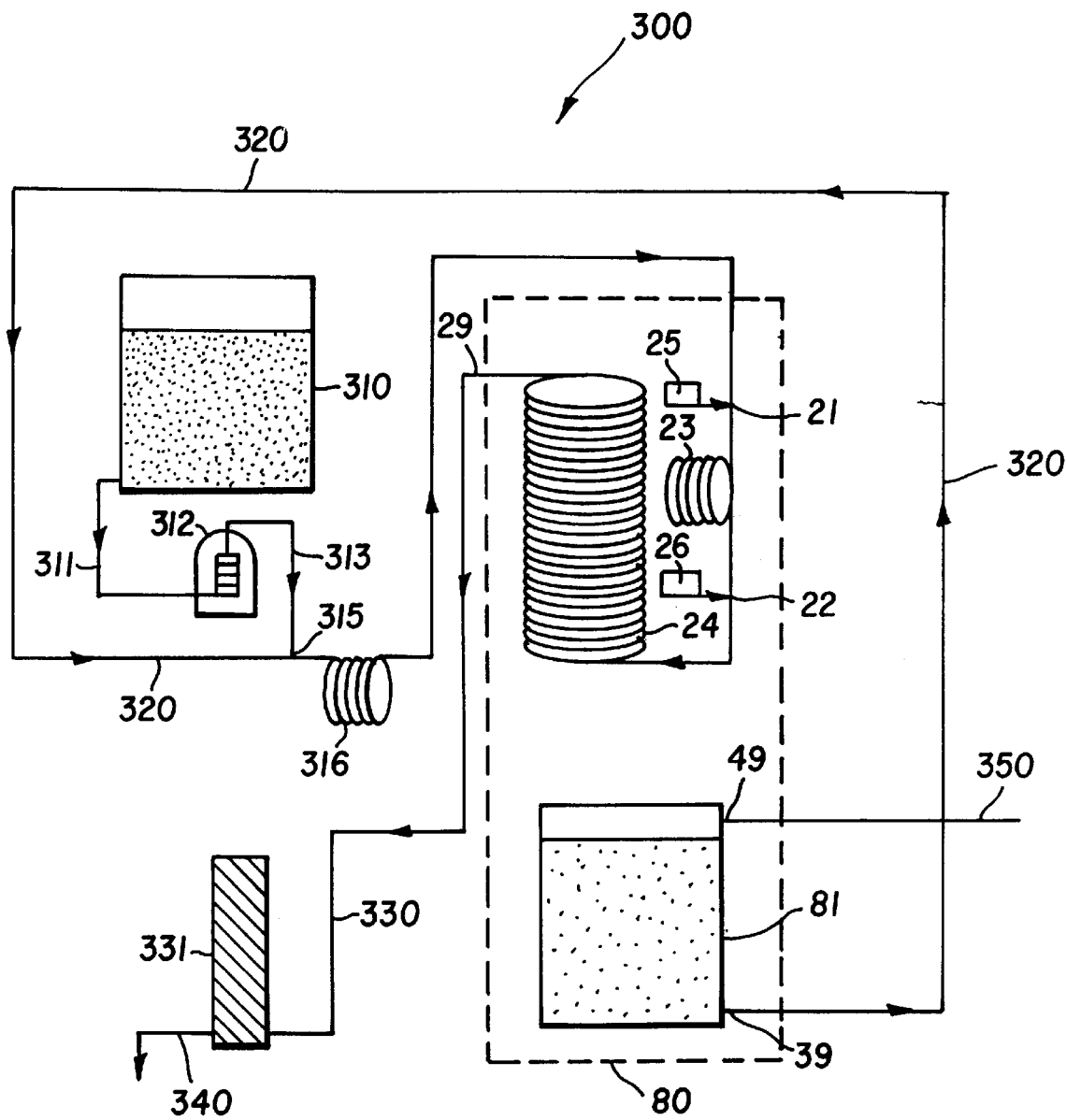
FIG. 3 is a schematic representation of yet another apparatus in which silver recovery is carried out.

A seasoned Kodak 885 hardened fixer was treated in the silver recovery unit 300 shown in FIG. 3, which incorporates a silver precipitating unit 80 according to U.S. Pat. No. 5,437,492 and described above. A continuous stream of untreated Kodak 855 hardened fixer at a flow rate of 100 mls/minute is provided in line 320. A solution of 7.5 g/l disodium EDTA dihydrate and 35 g/l sodium carbonate in storage vessel 310 is drawn off via line 311 by pump 312. The solution is then pumped to line 320 via line 313 and injected at a rate of 100 mls per minute through tee 315 into a seasoned Kodak 885 hardened fixer solution with a pH of about 4.8, flowing at a rate of 100 mls per minute in line 320. The resulting solution is then mixed within a tubular reactor 316. The solution is then returned to silver recovery unit 80 according to U.S. Pat. No. 5,437,792, which employs TMT as a silver precipitating agent and a flocculant to agglomerate the TMT-silver precipitate, as described above.

The treated solution exits unit 80 via outlet 29 and line 330 to filter 331. From filter 331, the solution is discharged via line 340.

About 25 gallons of seasoned Kodak 885 fixer with a silver level over 7.0 g/l was treated using this method. During the course of treatment, the effluent silver level was under 1.0 ppm, and no precipitation of the hardening agent was noted in the filter housing. It was concluded that pretreatment of Kodak 885 hardened fixer with a solution mixture of EDTA and sodium carbonate prevented formation of the hardening agent precipitate and enabled successful TMT treatment of hardened Kodak 885 fixer. It was also noted that the amount of disodium EDTA dihydrate necessary to prevent hardening agent precipitate in the Kodak 885 fixer was about 3.75 g/l, which was half the amount needed for the seasoned EA-5 fixer.

Example 7

A 500 ml sample of RP X-OMAT Fixer (3.00 g/l Ag, pH 4.9) was measured into a square 1 liter glass mixing jar and then placed in a "gang" paddle mixer. A solution that combined a complexing agent, base, and TMT was prepared with the concentration of TMT reduced from 15% to 7.5% such that the complexing agent and base would dissolve more readily. About 50 ml of a TMT 7.5% solution containing 140 g/l potassium carbonate and 40 g/l sodium citrate dihydrate was added to the fixer while mixing vigorously. After addition, the concentration of sodium citrate dihydrate in the jar was 4 g/l fixer. A yellow precipitate was immediately observed. After one minute, 25 ml of a copolymer flocculant (described in U.S. Pat. No. 5,437,792) was added to agglomerate the precipitate. The supernatant solution appeared clear. A sample of the solution was passed through a 0.45 micron filter and analyzed for silver content by ICP-AES. The results of the silver analysis showed the sample contained a silver concentration of <0.3 ppm.

This example demonstrates that it is possible to combine the TMT, the base, and the complexing agent into one solution to prevent the "gel-like" precipitation of the hardening agents and obtain a filtered effluent with a silver concentration under 1 ppm.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for precipitating silver from solutions containing silver and high valent cationic hardening agents which comprises adding 0.15 to 1.5 moles of chelating compound per mole of cationic hardening agent to a solution containing silver and high valent cationic hardening agents at a pH below 5.5 to complex the high valent cations selected from the group consisting of $Al^{+3}$ and $Zr^{+4}$, adjusting the pH above 5.5 with the addition of base and precipitating silver by the addition of a chemical precipitant for silver.

2. A process as in claim 1, comprising the additional step of adding a flocculant after addition of the chemical precipitant.

3. A process as in claim 1, wherein the amount of chelating compound added to the solution containing silver is less than the stoichiometric amount necessary to complex all high valent cations in the solution containing silver.

4. A process as in claim 1, wherein the amount of chelating compound added to the solution containing silver is less than one-half the stoichiometric amount necessary to complex all high valent cations in the solution containing silver.

5. A process as in claim 1, wherein the chemical precipitant for silver is mercapto-s-triazine of formula I wherein

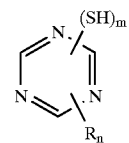

wherein:
R is H, —$NH_4$,—OH, $C_{1-8}$ alkyl, $C_{1-8}$ alkoxy, phenyl, cyclohexyl, oxazinyl, phenoxy, NR' or SR";
R' is H, $C_{1-8}$ alkyl, phenyl, cyclohexyl, naphthyl or benzyl;
R" is $C_{1-8}$ alkyl, phenyl, cyclohexyl, naphthyl or benzyl,
m=1–3 and
n=0–2, or a salt thereof.

6. A process as in claim 1, wherein the chemical precipitant for silver is trimercapto-s-triazine (TMT) or a salt thereof.

7. A process as in claim 1, wherein the pH is adjusted to a value within the range of 6.0–9.0 by the addition of base.

8. A process as in claim 1, wherein the chelating compound is selected from the group consisting of carboxylate chelates, amine carboxylate chelates, polycarboxylate chelates and polymeric chelates.

9. A process as in claim 1, wherein the chelating compound is selected from sodium citrate dihydrate and EDTA dihydrate.

10. A process as in claim 1, wherein the silver solution is a spent hardening photoprocessing solution.

11. A process as in claim 1, wherein the chelating compound, base and chemical precipitant are added simultaneously to the solution containing silver.

12. A process as in claim 1, wherein the chelating compound is added to the solution containing silver either separately or with base, prior to the addition of chemical precipitant for silver.

13. A process as in claim 1, wherein the chelating compound, base and chemical precipitant for silver are added continuously to a continuous stream of solution containing silver and high valent cations.

14. A process as in claim 2, wherein the solution is filtered after the addition of flocculent and the filtrate has a silver content of less than 1 ppm.

* * * * *